United States Patent [19]
Nakashimo

[11] Patent Number: 6,051,956
[45] Date of Patent: Apr. 18, 2000

[54] RECHARGEABLE BATTERY PACK WITH PRE-END SIGNAL OUTPUT TERMINAL AND ELECTRONIC DEVICE CONTAINING RECHARGEABLE BATTERY PACK

[75] Inventor: Takao Nakashimo, Chiba, Japan

[73] Assignee: Seiko Instruments Inc., Japan

[21] Appl. No.: 08/866,621

[22] Filed: May 30, 1997

[51] Int. Cl.$^7$ .................................................. H01M 10/46
[52] U.S. Cl. .................................................. 320/132
[58] Field of Search .................................. 320/127, 130, 320/132, 134, 135, 136, FOR 112, FOR 113, FOR 118, FOR 128, FOR 129

[56] References Cited

U.S. PATENT DOCUMENTS

| | | | |
|---|---|---|---|
| 5,493,197 | 2/1996 | Eguchi et al. | 320/134 X |
| 5,554,919 | 9/1996 | Uchida | 320/132 |
| 5,644,211 | 7/1997 | Tokuyama | 320/162 |
| 5,654,622 | 8/1997 | Toya et al. | 320/129 |
| 5,742,148 | 4/1998 | Sudo et al. | 320/134 |

*Primary Examiner*—Edward H. Tso
*Attorney, Agent, or Firm*—Adams & Wilks

[57] ABSTRACT

When overdischarging or overcurrent of a rechargeable battery pack is detected, the output voltage current and output current between VDD and VSS of the pack become zero. In this case, a device, or a load, connected with the battery pack may lose data or malfunction. In a rechargeable battery pack 1, if a voltage V1 across a secondary battery decreases below a certain detection voltage V2, a pre-end signal output circuit 5 produces a pre-end output signal, which is made to persist until an overcharging/overdischarging-and-overcurrent control circuit 3 senses that the secondary battery voltage V1 has decreased below an overdischarging detection voltage V3. The output signal from the control circuit 3 causes the switch circuit 4 to stop discharging of the secondary battery. Therefore, the device, or load, can save data or otherwise operate.

17 Claims, 7 Drawing Sheets

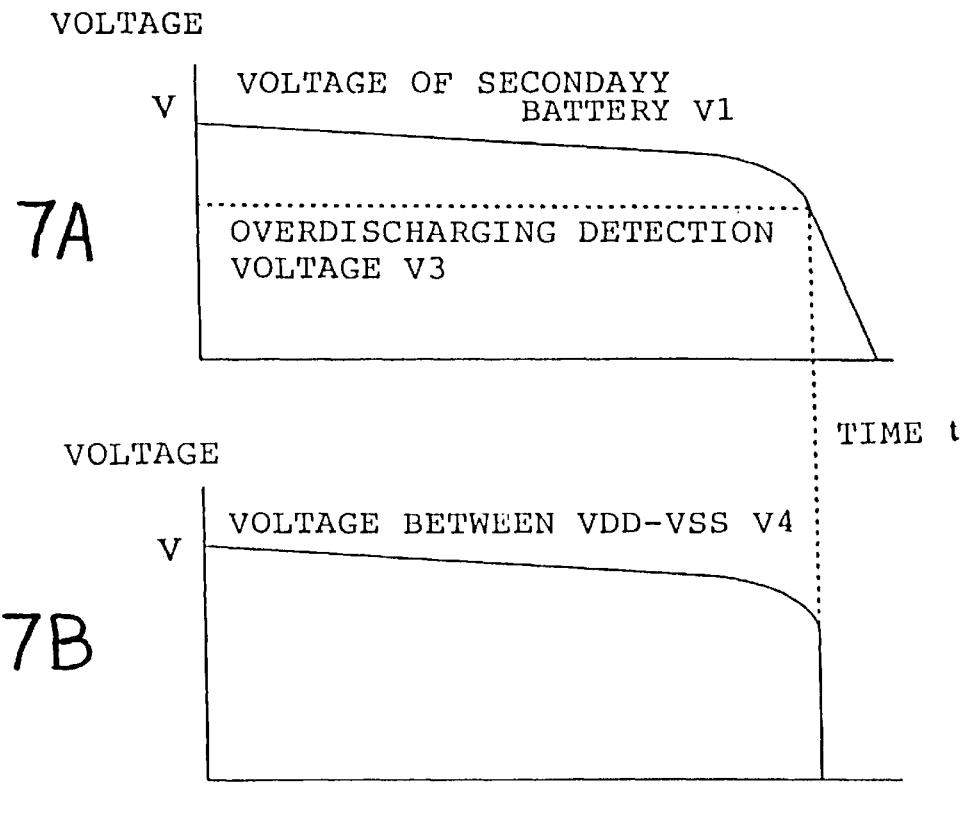

RECHARGEABLE BATTERY PACK WITH PRE-END SIGNAL OUTPUT TERMINAL AND ELECTRONIC DEVICE CONTAINING RECHARGEABLE BATTERY PACK

BACKGROUND OF THE INVENTION

The present invention relates to a rechargeable battery pack using a secondary battery.

A circuit as shown in FIG. 6 is known as a rechargeable battery pack 1 using a secondary battery. This secondary battery, indicated by numeral 2, is connected to an external terminal VDD or VSS via a switch circuit 4. Also, an overcharging/overdischarging-and-overcurrent control circuit 3 is connected to the secondary battery 2. This control circuit 3 acts to detect the voltage across, or the current through, the secondary battery 2. That is, the control circuit 3 detects the state of overcharging (i.e., that the voltage across the secondary battery 2 is higher than a given high voltage value) or the state of overdischarging (i.e., that the voltage is lower than a certain voltage value) and the state of an overcurrent (i.e., that the current is greater than a given current value). The control circuit 3 detects overcharging/overdischarging and overcurrent and produces a signal to turn off the switch circuit 4, stopping the supply of energy to the load connected to the VSS or VDD (such as a portable computer using the secondary battery).

Thus, the rechargeable battery pack 1 controls the switch circuit 4 inserted between the secondary battery 2 and the external terminal to prevent overcharging of the secondary battery 2 and an excessive decrease in the storage capacity of the secondary battery 2 due to supply of energy to the load from the secondary battery 2.

Let V1 be the voltage developed across the secondary battery. Let V3 be a voltage used to detect the state of overdischarging. This voltage V3 will be referred to as the overdischarging detection voltage. With the prior art rechargeable battery pack, if the secondary battery voltage V1 decreases below the overdischarging detection voltage V3 as shown in FIG. 7 (A), the overcharging/overdischarging-and-overcurrent control circuit detects the overdischarging and overcurrent, turning off the switch circuit 4. Immediately thereafter, the output voltage V4 between the VSS and VDD decreases to 0 (FIG. 7 (B)). At this time, if the load using this rechargeable battery pack is a computer employing a secondary battery, for example, and if the computer is still operating after the moment the voltage between VSS and VDD decreases to 0, then data loss or a malfunction may occur.

SUMMARY OF THE INVENTION

In order to solve the foregoing problem, this invention equips a rechargeable battery pack with a pre-end signal output terminal. If overdischarging or overcurrent of a secondary battery is detected, a pre-end signal is produced from the pre-end signal output terminal. Then, the switch circuit is turned off.

If overdischarging or overcurrent is detected, the switch circuit is turned off after the pre-end signal is produced. Therefore, the operation of the load using the rechargeable battery pack is stopped before the power supply decreases down to zero. Since the voltage decreases to 0 after the operation of the load is stopped, malfunction of the load can be prevented.

BRIEF DESCRIPTION OF THE DRAWINGS

FIGS. 7A–7B are graphs of output signals from the prior art rechargeable battery pack.

DETAILED DESCRIPTION OF THE PREFERRED EMBODIMENTS

Figure 1:
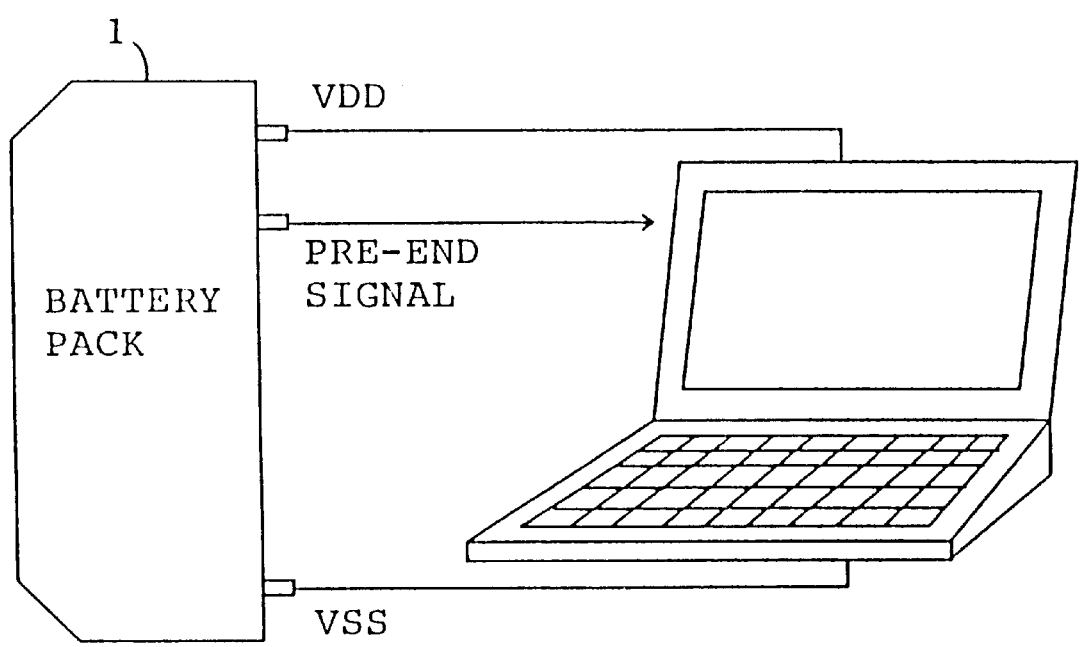
FIG. 1 is a view illustrating a rechargeable battery pack in accordance with the present invention and an apparatus, or a load, connected with the battery pack.

Embodiments of this invention are hereinafter described by referring to the drawings.

FIG. 1 is a view illustrating a rechargeable battery pack in accordance with the present invention and an apparatus connected as a load with the battery pack. The rechargeable battery pack, indicated by 1, is equipped with a pre-end signal output terminal, as well as external terminals VSS and VDD. The external terminal VSS produces the minimum potential of the battery pack, while the external terminal VDD produces the maximum potential of the battery pack. The above-described pre-end signal output terminal gives rise to a pre-end signal slightly before the output between VDD and VSS is turned off and reaches 0. The apparatus receiving the pre-end signal deactivates the load using this battery pack 1 or otherwise functions in response to the signal.

Figure 2:
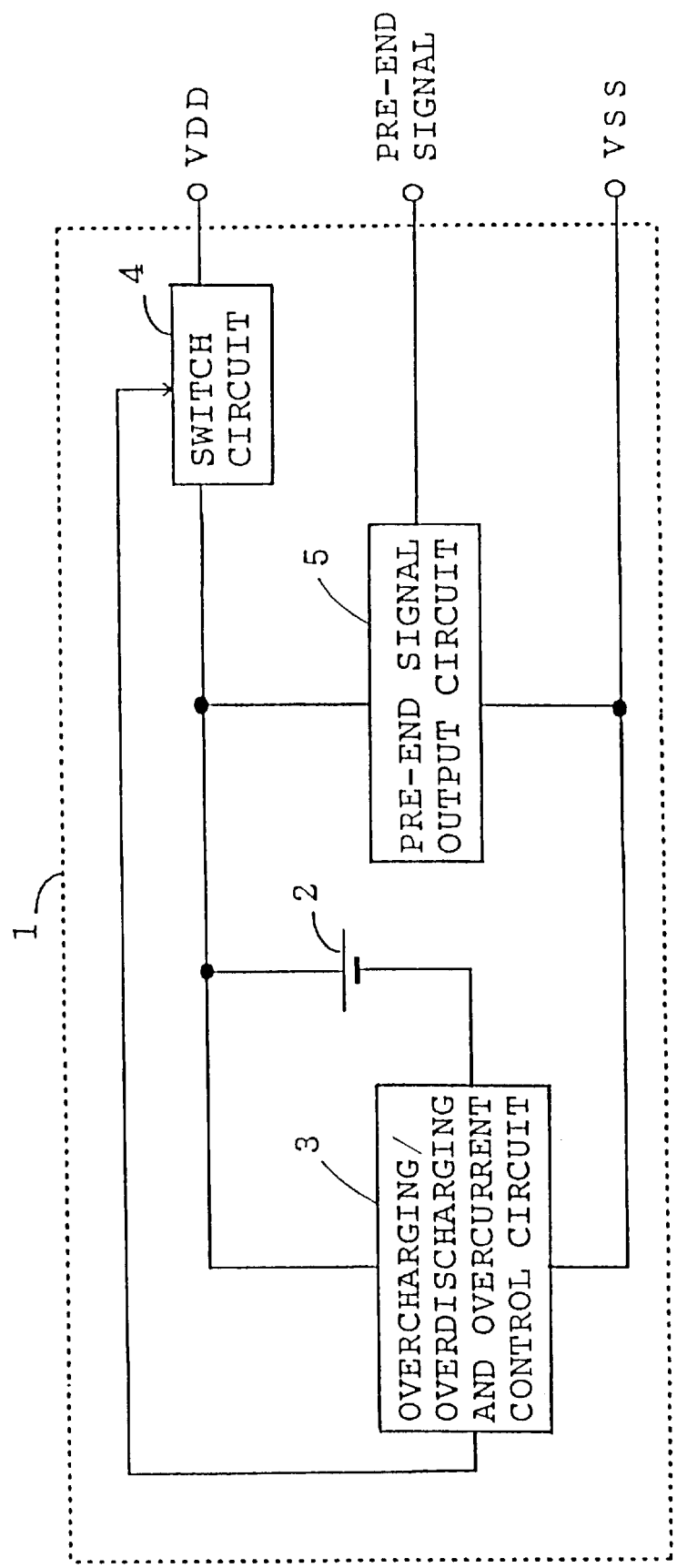
FIG. 2 is a circuit block diagram of Embodiment 1 of the rechargeable battery pack in accordance with the invention.

FIG. 2 is a circuit block diagram illustrating one example of a rechargeable battery pack in accordance with the present invention. A secondary battery 2 is connected with an external terminal VSS or VDD via a switch circuit 4 and via an overcharging/overdischarging-and-overcurrent control circuit 3. If the resistance of the switch circuit 4 and the resistance of the control circuit 3 are ideally equal to zero, the output terminal VDD produces the maximum potential of the secondary battery 2, while VSS produces the minimum potential. A pre-end signal output circuit 5 is connected between the VDD and VSS, and the voltage across the secondary battery 2 is detected.

Figure 3A:
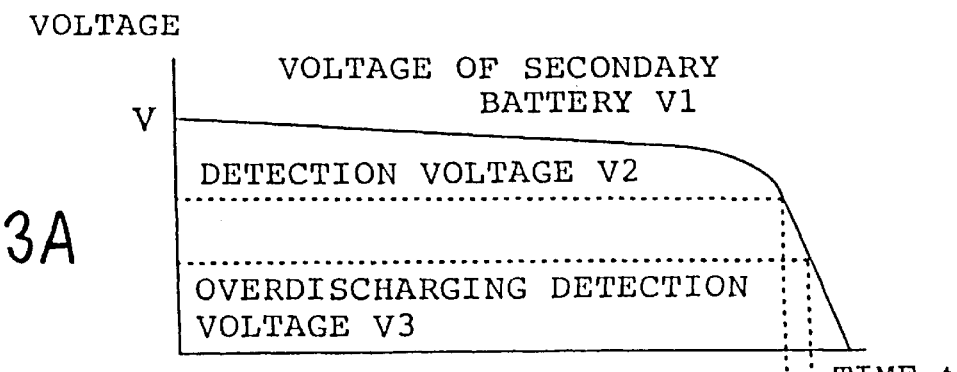
FIGS. 3A–3C are graphs of output signals from the rechargeable battery pack of Embodiment 1 of the invention.
Figure 3B:
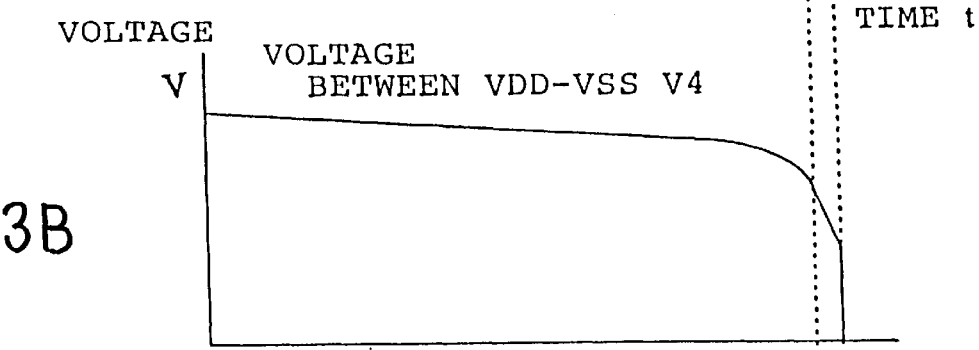

The operation of the circuit block of the rechargeable battery pack 1 shown in FIG. 2 is next described by referring to FIGS. 3A–3B. As the secondary battery 2 discharges, the voltage V1 across the secondary battery drops and reaches a detection voltage V2 that is set slightly higher than a voltage V3 at which overdischarging is detected (see FIG. 3(A)). The pre-end signal output circuit 5 detects the detection voltage V2 and produces a pre-end signal to the pre-end signal output terminal. This pre-end signal is made to persist until the voltage V1 across the secondary battery reaches the overdischarge detection voltage V3 (see FIG. 3(B) and (C)).

Figure 3C:
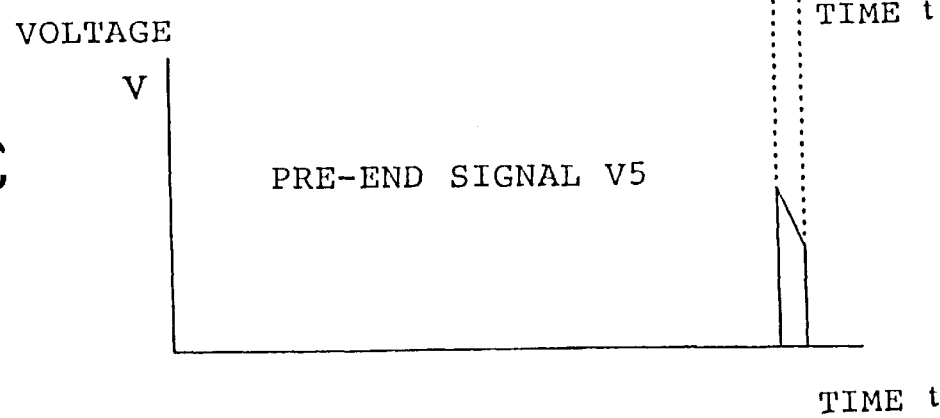

If the secondary battery 2 discharges further and the voltage V1 across the secondary battery reaches the overdischarge detection voltage V3, the overcharging/overdischarging-and-overcurrent control circuit 3 shown in FIG. 3 detects overdischarging and produces an /output signal. The output from the overcharging/overdischarging-and-overcurrent control circuit 3 is applied to the switch circuit 4 and turns it off. This reduces the voltage V4 between the VDD and VSS to 0, thus stopping the supply of energy to the load.

Figure 4:
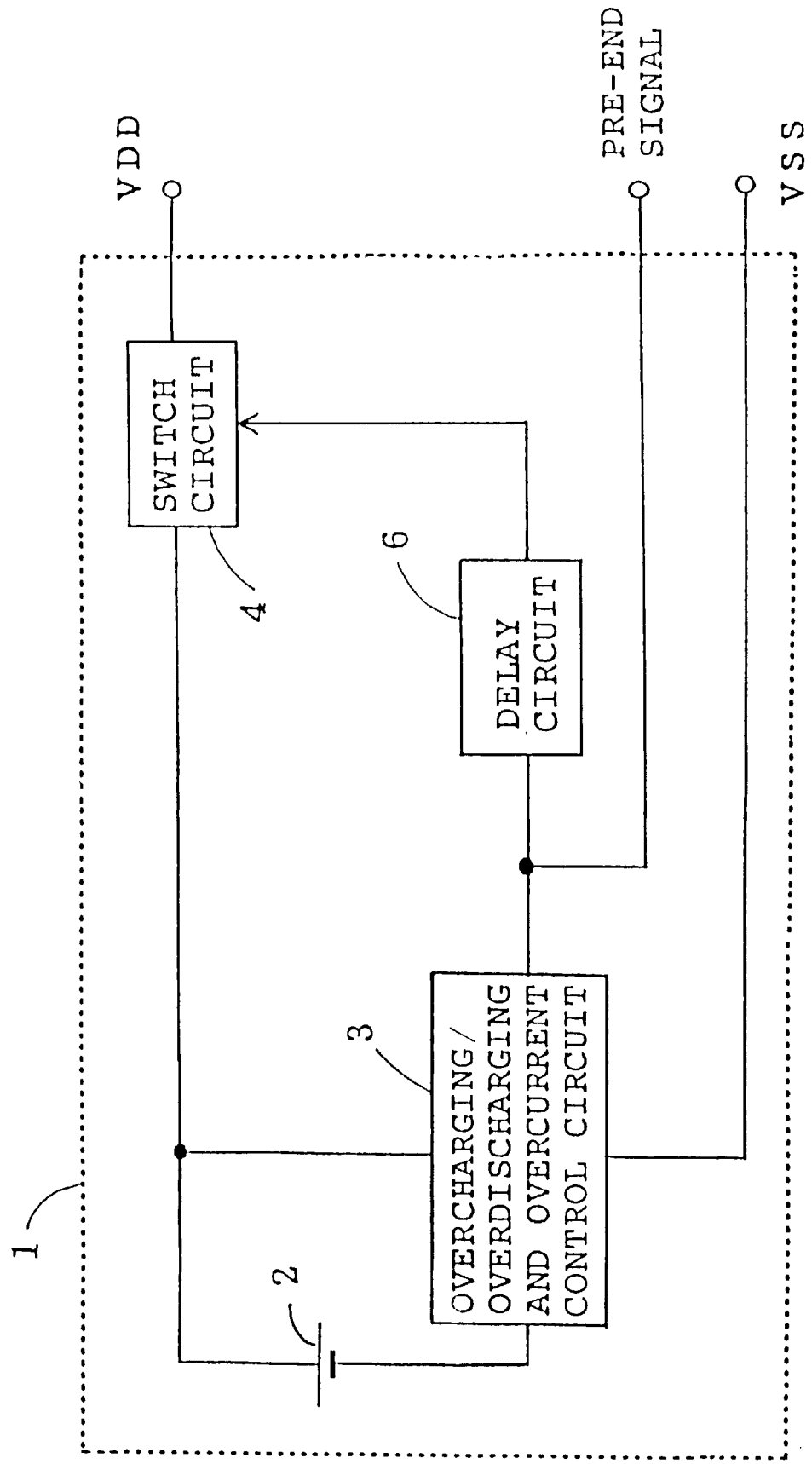
FIG. 4 is a circuit block diagram of a second embodiment of the rechargeable battery pack in accordance with the invention.

FIG. 4 represents another embodiment of the rechargeable battery pack in accordance with the present invention. A secondary battery 2 is connected to an external terminal VSS or VDD via a switch circuit 4 and via a circuit 3 for controlling overcharging/overdischarging and overcurrent. In the present embodiment, the pre-end signal is an output from the overcharging/overdischarging-and-overcurrent control circuit 3. The switch circuit 4 is controlled by the output signal from the overcharging/overdischarging-and-overcurrent control circuit 3, which is in turn delayed by a delay circuit 6. VDD produces the maximum potential of the secondary battery 2, whereas VSS produces the minimum potential.

Figure 5A:
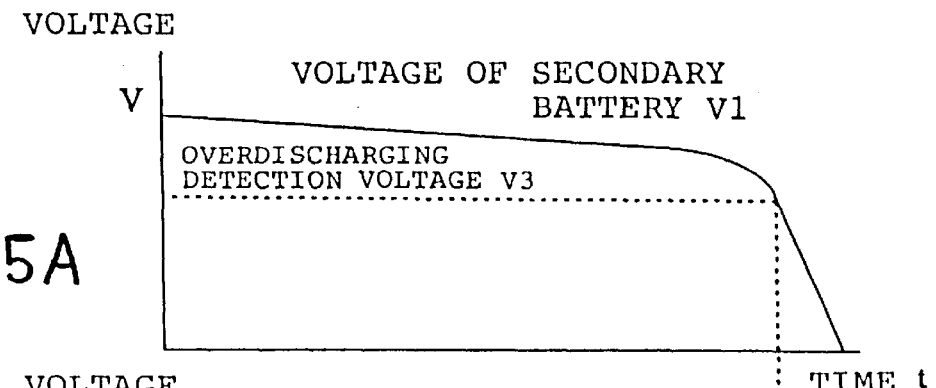
FIGS. 5A–5C are graphs of output signals from the second embodiment of the rechargeable battery pack in accordance with the invention.
Figure 5B:
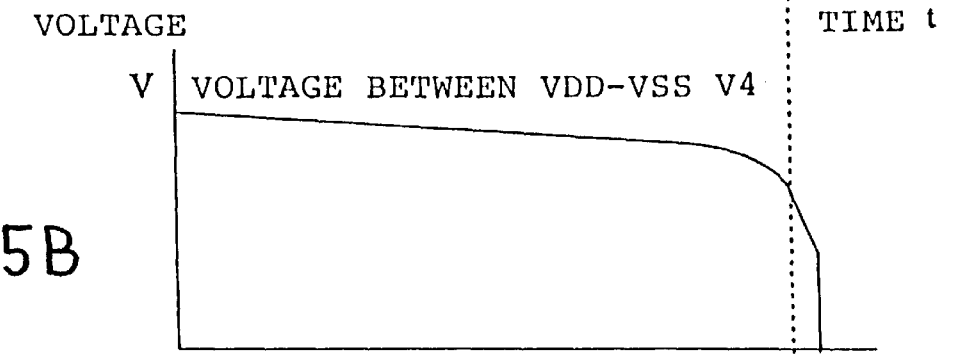
Figure 5C:
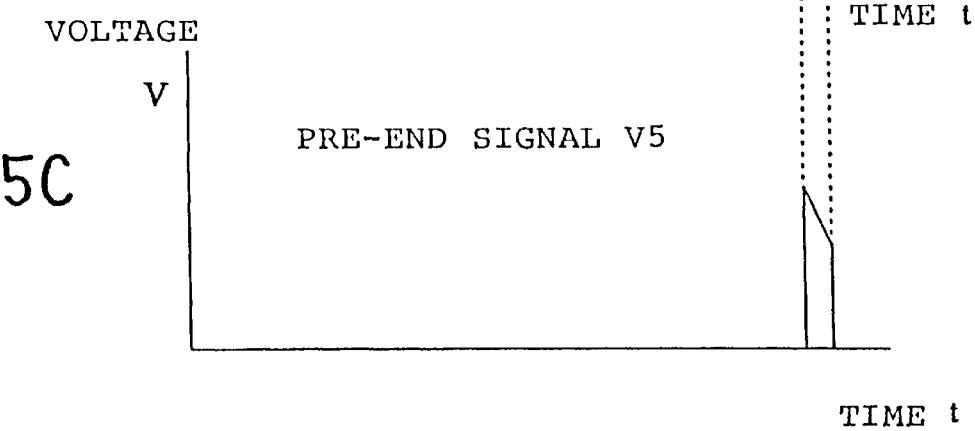
Figure 6:
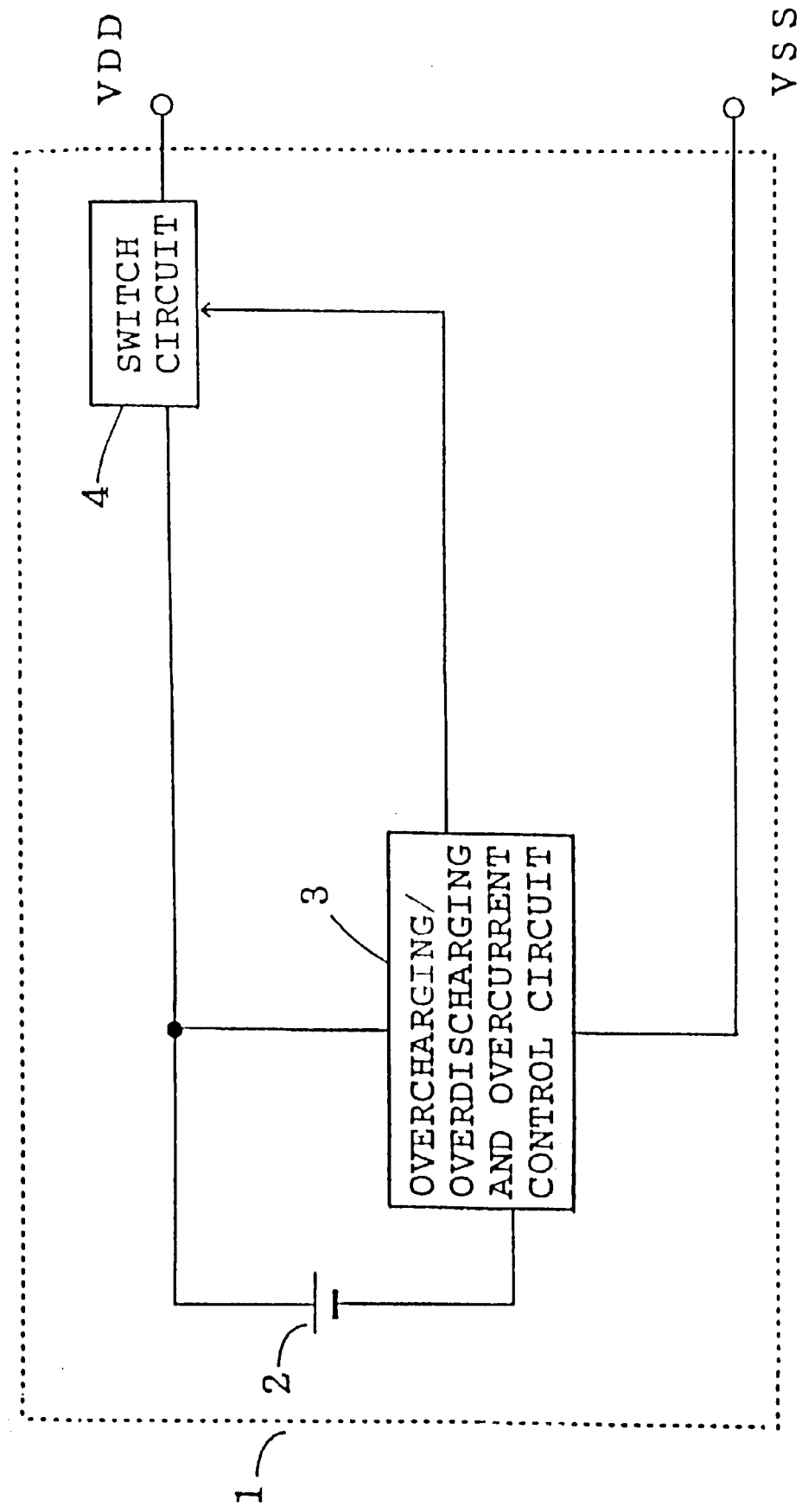
FIG. 6 is a circuit block diagram of the prior art rechargeable battery pack.

A case in which overdischarging has been detected by the embodiment of FIG. 4 is described by referring to FIG. 5. When discharging occurs and the voltage V1 across the secondary battery V1 drops to the overdischarging detection voltage V3 as shown in FIG. 5(A), the overcharging/overdischarging-and-overcurrent control circuit 3 of FIG. 4 detects the overdischarging. The output from this control circuit 3 becomes a pre-end output signal V5 supplied to the pre-end signal output terminal. This output signal V5 is also applied to the delay circuit 6. After a lapse of a given period, the delay circuit 6 produces a signal to turn off the switch circuit 4. This reduces the voltage V between VDD and VSS, thus stopping the supply of energy to the load (see FIG. 5(B)). The pre-end signal V5 is kept produced until the voltage between VDD and VSS decreases down to zero (see FIG. 5(C)).

The circuitry is operated similarly where an overcurrent is detected. In particular, when the overcharging/overdischarging-and-overcurrent control circuit 3 detects an overcurrent, a pre-end output signal V5 appears at the pre-end signal output terminal and is applied to the delay circuit 6. After a lapse of a given period, the delay circuit 6 produces a signal to turn off the switch circuit 4. The pre-end signal V5 is made to persist until the switch circuit 4 is turned off.

The inventive rechargeable battery pack is practiced in forms described as thus far and produces the following effects.

A pre-end output is produced before an overcharging/overdischarging-and-overcurrent detection circuit produces a signal to turn off a switch circuit. Therefore, a load, or a device, can previously know that the supply of voltage and current from the secondary battery will be stopped. Consequently, a saving operation or the like can be performed. That is, the present invention provides a rechargeable battery pack that prevents the load using the secondary battery from malfunctioning.

What is claimed is:

1. A rechargeable battery pack comprising:
   a rechargeable secondary battery connectable in use to an external device;
   an overcharging/overdischarging-and-overcurrent control circuit connected to the secondary battery for detecting at least one of a voltage across the secondary battery and a current through the secondary battery and for outputting an indicating signal when the secondary battery is in one of a first state in which the secondary battery is approaching one of an overcharged state, an overdischaraed state and an overcurrent state and a second state in which the secondary battery is in one of an overcharged state, an overdischarged state and an overcurrent state;
   a switch circuit connected to the overcharging/overdischarging-and-overcurrent control circuit for selectively disconnecting the rechargeable secondary battery from the external device based on the indicating signal of the overcharging/overdischarging-and-overcurrent control circuit; and
   means for outputting a pre-end signal shortly before the switch circuit disconnects the rechargeable secondary battery from the external device to thereby enable a task to be performed before the secondary battery is disconnected from the external device.

2. A rechargeable battery pack according to claim 1; wherein the overcharging/overdischarging-and-overcurrent control circuit includes a circuit for detecting whether the voltage across the secondary battery has reached either of a first or a second overdischarging detecting voltage, the first overdischarging detecting voltage being higher than the second overdischarging detecting voltage, for controlling the means for outputting a pre-end signal to output the pre-end signal when a voltage of the secondary battery reaches the first overdischarging detecting voltage and for controlling the switch circuit to disconnect the secondary battery from the external device when the voltage of the secondary battery reaches the second overdischarging detecting voltage.

3. A rechargeable battery pack comprising:
   a rechargeable secondary battery connectable in use to an external device;
   an overcharging/overdischarging-and-overcurrent control circuit connected to the secondary battery for detecting at least one of a voltage across the secondary battery and a current through the secondary battery and for outputting an indicating signal when the secondary battery is in one of a first state when the detected voltage is approaching one of a predetermined overcharge voltage and a predetermined overdischarge voltage and a second state when the detected current approaches a predetermined overcurrent value;
   a delay circuit for delaying the indicating signal and outputting a delayed indicating signal;
   a switch circuit for selectively connecting and disconnecting the secondary battery to and from the external device in response to the delayed indicating signal; and
   means for outputting a pre-end signal shortly before the switch circuit disconnects the secondary battery from the external device to thereby enable a task to be performed before the secondary battery is disconnected from the external device.

4. A rechargeable battery pack according to claim 3; wherein the means for outputting a pre-end signal comprises the overcharging/overdischarging-and-overcurrent control, circuit, and the indicating signal output by the overcharging/overdischarging-and-overcurrent control circuit is the pre-end signal.

5. In a rechargeable battery pack which is connectable in use to an external device and which has means for detecting the states of overcharging, overdischarging and overcurrent of a secondary battery to control charging and discharging thereof: a detecting circuit for detecting at least one of a voltage across the secondary battery and a current through the secondary battery; and means for producing a pre-end signal shortly before the secondary battery becomes in one of an overcharged, an overdischarged and an overcurrent state to thereby enable a task to be performed before the secondary battery is disconnected from the external device.

6. A rechargeable battery pack according to claim 5; further comprising a control circuit for producing an indicating signal when the detected value indicates that the secondary battery is in one of an overcharged, overdischarged and overcurrent state; and a switch circuit connected to the control circuit and being selectively connectable to the external device according to the indicating signal such that the battery is disconnected from the external device when one of an overcharged, overdischarged and overcurrent state is detected.

7. A rechargeable battery pack according to claim 5; wherein the external device comprises a portable computer.

8. A rechargeable battery pack according to claim 5; further comprising a control circuit for producing an indicating signal when the detected value indicates that the secondary battery is approaching one of an overcharged, overdischarged and overcurrent state; and a delay circuit for delaying the indicating signal and outputting a delayed indicating signal as the pre-end signal, and wherein the means for producing a pre-end signal comprises the control circuit.

9. A rechargeable battery pack according to claim 8; wherein the external device comprises a portable computer.

10. A rechargeable battery pack according to claim 8; further comprising a switch circuit connected to the delay circuit and the secondary battery and being selectively connectable to the external device according to the indicating signal such that the secondary battery is disconnected from the external device when one of an overcharged, overdischarged and overcurrent state is detected.

11. An electronic device having a rechargeable battery pack, the rechargeable battery pack comprising: a control circuit for detecting at least one of a voltage across and a current through a battery, determining whether the battery is in one of an overcharged, an overdischarged and an overcurrent state, and outputting an indicating signal when the battery is in one of an overcharged, an overdischarged and an overcurrent state; and means for producing a pre-end signal before the indicating signal is produced to enable a task to be performed before the battery enters an overcharged, overdischarged or overcurrent state.

12. A rechargeable battery pack according to claim 11; further comprising a switch circuit connected to the control circuit and the battery and being selectively connectable to the electronic device according to the indicating signal such that the battery is disconnected from the electronic device when one of an overcharged, overdischarged and overcurrent state is detected.

13. A rechargeable battery pack according to claim 11; wherein the electronic device comprises a portable computer.

14. A rechargeable battery pack comprising: external connection terminals connectable to a rechargeable battery and an external device; an overcharging/overdischarging-and-overcurrent control circuit connected to the rechargeable battery when in use for detecting a voltage across the secondary battery and a current through the rechargeable battery; a switch circuit connected to the rechargeable battery and the external device when in use for disconnecting the rechargeable battery from the external device when the rechargeable battery is in one of an overcharged state, an overdischarged state and an overcurrent state; and means for outputting a pre-end signal shortly before the rechargeable battery becomes in one of an overcharged, an overdischarged and an overcurrent state to thereby enable a task to be performed before the rechargeable battery is disconnected from the external device.

15. A rechargeable battery pack according to claim 14; wherein the overcharging/overdischarging-and-overcurrent control circuit includes a circuit for comparing the voltage across the rechargeable battery to a first and a second overdischarging detecting voltage, the first overdischarging detecting voltage being higher than the second overdischarging detecting voltage, controlling the means for outputting a preend signal so that the pre-end signal is output when the voltage across the rechargeable battery reaches the first overdischarging detecting voltage, and controlling the switch circuit to disconnect the rechargeable battery from the external device when the voltage of the rechargeable battery reaches the second overdischarging detecting voltage.

16. A rechargeable battery pack according to claim 14; wherein the overcharging/overdischarging-and-overcurrent control circuit includes a circuit for comparing the voltage across the rechargeable battery to a predetermined value slightly higher than an overdischarging detecting voltage at which the rechargeable battery becomes in an overcharged state and outputting an indicating signal when the voltage across the battery reaches the overdischarging detecting voltage; and further comprising a delay circuit for delaying the indicating signal and outputting a delayed indicating signal; wherein the means for outputting a pre-end signal comprises the overcharging/overdischarging-and-overcurrent control circuit, and the pre-end signal comprises the indicating signal.

17. A rechargeable battery pack according to claim 16; wherein the delay circuit outputs the delayed indicating signal to the switch circuit and the delayed indicating signal is produced a sufficient amount of time after the indicating signal is produced to permit the task to be performed before the rechargeable battery is disconnected from the external device by the switch circuit in response to the delayed indicating signal.

* * * * *